United States Patent [19]

Alvisi

[11] Patent Number: 4,947,656
[45] Date of Patent: Aug. 14, 1990

[54] INTEGRATED APPARATUS FOR PRODUCING WARM WATER

[75] Inventor: Cesare Alvisi, San Bonifacio, Italy

[73] Assignee: Italclimax S.r.l., Verona, Italy

[21] Appl. No.: 376,495

[22] Filed: Jul. 5, 1989

[30] Foreign Application Priority Data

Jul. 28, 1988 [IT] Italy .................................. 84959 A/88

[51] Int. Cl.⁵ .............................................. F25B 27/00
[52] U.S. Cl. .................................. 62/235.1; 62/238.6; 237/2 B
[58] Field of Search ............ 237/2 B; 62/235.1, 238.6, 62/238.3, 324.1, 323.1

[56] References Cited

U.S. PATENT DOCUMENTS 4,235,369 11/1980 Huber .................................. 237/2 B
4,351,161 9/1982 Jones .................................. 237/2 B X Primary Examiner—Henry A. Bennet
Attorney, Agent, or Firm—Guido Modiano; Albert Josif

[57] ABSTRACT

An integrated apparatus for producing warm or sanitary water, comprising in combination a heat pump having a compressor, a condenser, an expansion valve and an evaporator connected in series to convey a refrigerating fluid, an electric or fuel-powered (gas- or gas oil-powered) boiler accommodating the condenser of the heat pump, and at least one greenhouse effect heat source. A chamber for receiving the evaporator of the heat pump is provided downstream of the boiler and is in communication both with the boiler to receive therefrom the flue gases and with the greenhouse effect heat source to receive therefrom warm air which, together with the exhaust fumes, gives off heat to the evaporator.

23 Claims, 2 Drawing Sheets

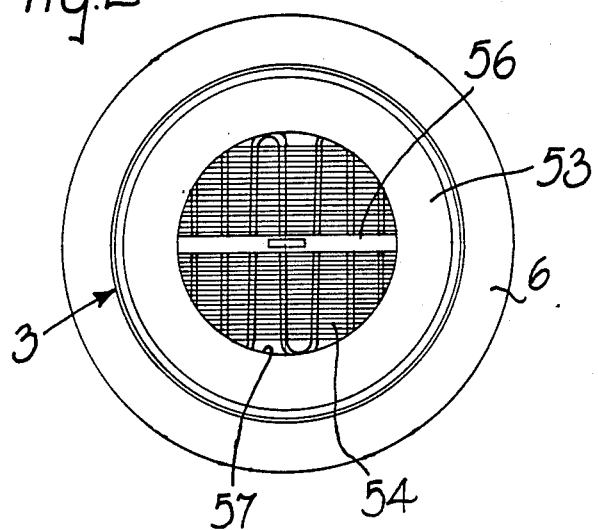
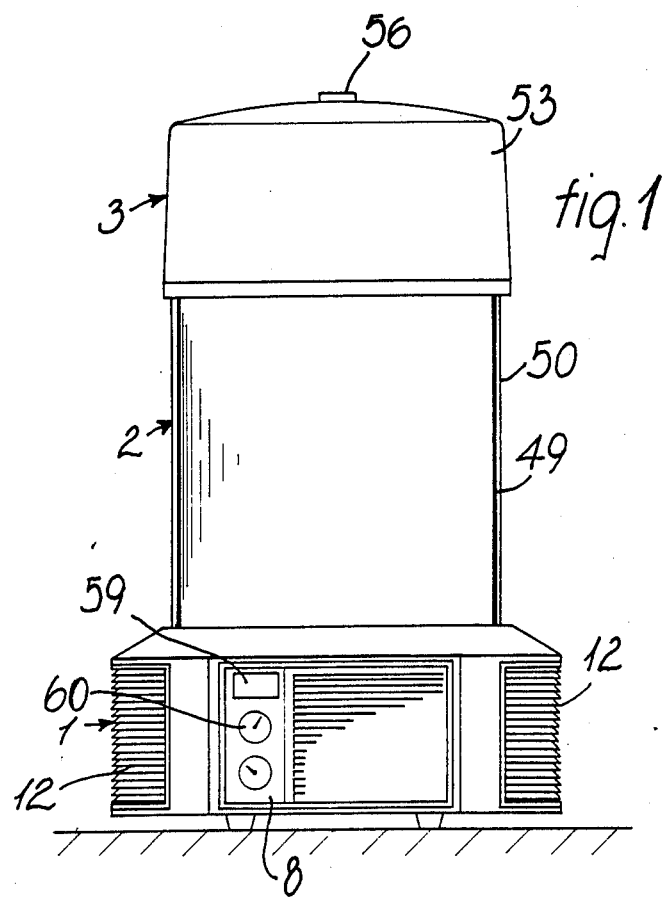

INTEGRATED APPARATUS FOR PRODUCING WARM WATER

BACKGROUND OF THE INVENTION

The present invention relates to an integrated apparatus for producing warm water.

"Integrated" apparatuses for producing warm water, for example for heating systems and/or for sanitary uses, i.e. apparatuses employing a heat pump combined with one or more auxiliary heat sources, such as a gas-powered, gas oil-powered electric-resistor burner and/or solar-energy means, i.e. solar-panels or taking advantage of the greenhouse effect, have already been proposed in the past. In general, such integrated apparatuses can be quite efficient, which results in considerable savings in terms of heat originating from non-renewable energy sources. However, problems sometimes occur in operating integrated apparatuses and in exploiting at best all heat made available by the heat sources. Thus, for example, the refrigerating gas flowing through the refrigerating circuit of a heat pump tends to become overheated in the regions close to the gas- or gas oil-powered burner, and any overheating can significantly alter its physical and chemical characteristics and therefore the behavior of the refrigerating fluid in the circuit, especially in cases when the supply of electric power to its driving apparatus is accidentally interrupted.

Furthermore, as is known, an air/water heat pump is best effective at temperatures of a few degrees above 0° C. As a matter of fact, when the temperature drops below zero the evaporator of the heat pump becomes covered with a layer of ice which is difficult to eliminate unless additional thermal energy is supplied to it.

SUMMARY OF THE INVENTION

An object of the present invention is to provide an integrated apparatus for producing warm water wherein a refrigerating fluid flows through a heat pump at a speed which is controlled according to the instantaneous thermal load, thereby ensuring a continuous heated-water supply.

Another object of the present invention is to provide an integrated apparatus wherein formation of ice on the evaporator is effectively prevented.

A further object of the present invention is to provide an integrated apparatus wherein the activation of the heat pump has priority with respect to other heat sources, so as to limit at a minimum the intervention of the burner or of other high-cost and therefore valuable thermal energy sources.

Another object of the present invention is to provide an integrated apparatus for producing warm water which is competitive in terms of manufacturing costs and of its yield and operational reliability.

These and further objects which will become better apparent hereinafter are achieved by an integrated apparatus for producing warm water, comprising in combination a heat pump having a compressor, a condenser, an expansion valve and an evaporator connected in series through a pipe system arranged to convey a refrigerating fluid, a boiler in which said condenser of the heat pump is located, and at least one greenhouse effect heat source, and wherein a chamber accommodating said evaporator of the heat pump is provided downstream of the boiler, and is in fluid communication with said boiler to receive therefrom the flue gases or exhaust and with the or each greenhouse effect heat source thereby receiving therefrom warm air which, together with the flue gases gives off heat to the evaporator.

Said boiler advantageously comprises a peripheral tank which delimits an inner furnace which accommodates the burner, and a lobe tank arranged at least partly within said furnace above the burner, the said chamber accommodating the said evaporator being arranged at the top of said furnace.

BRIEF DESCRIPTION OF THE DRAWINGS

Further features and advantages of the invention will become apparent from the following detailed description of a presently preferred embodiment, which is given merely by way of non-limitative example with reference to the accompanying drawings, wherein:

FIG. 1 is an elevation view of an integrated apparatus;

FIG. 2 is a top or plan view of FIG. 1;

DESCRIPTION OF THE PREFERRED EMBODIMENTS

Figure 4:
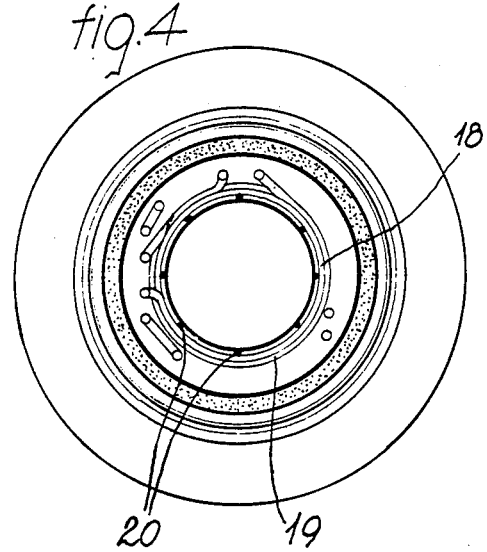
FIG. 4 is a simplified sectional view taken along the line 4—4 of FIG. 3.

With reference to the above described Figures, it will be seen that an integrated apparatus for producing warm water comprises a base 1, a preferably cylindrical intermediate body 2 and a cover or dome 3 arranged at the top of the cylindrical body 2.

The base 1 has a supporting frame comprising uprights 4, for example four uprights arranged at the four corners of a square, and crosspieces 5 protruding beyond the uprights.

Advantageously the base has outer walls 6 which delimit a chamber 7 which accommodates various components of the apparatus and control instruments leading to an instrument panel 8.

Figure 3:
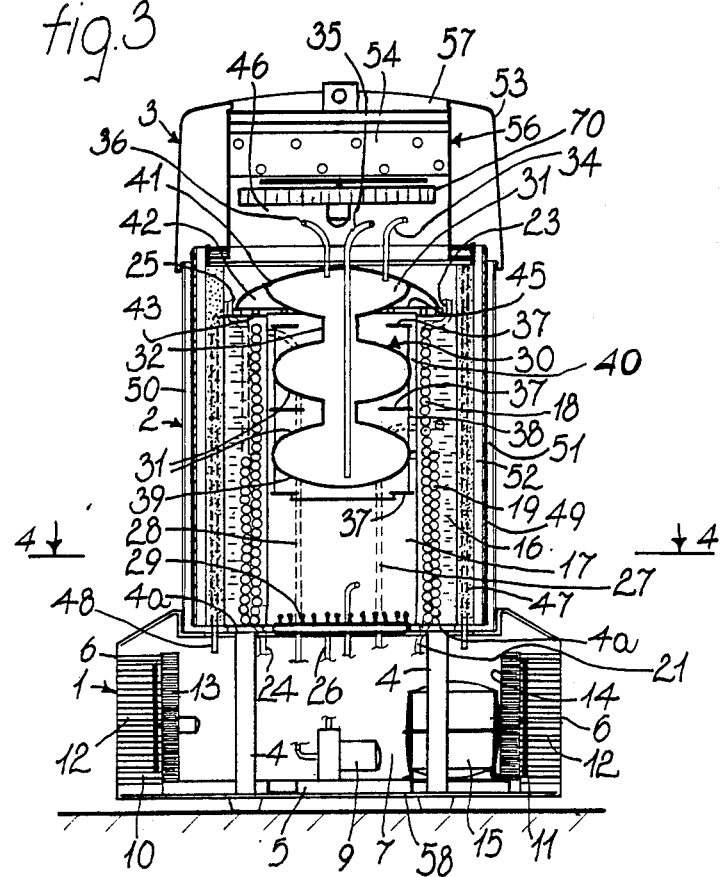
FIG. 3 is a diagrammatic sectional view, taken along an axial vertical plane, of the apparatus of FIG. 1.

FIG. 3 illustrates, inside the chamber 7, a water circulation pump 9, two air/refrigerating fluid heat exchangers 10 and 11 arranged to receive external environmental air sucked in through grids 12 provided in the walls 6 by respective electric fans 13 and 14, and a compressor 15 for the refrigerant or heat-transfer medium.

The uprights 4 have a flanged top 4a which acts as a resting and supporting seat for the intermediate cylindrical body 2 having a vertical axis. Said body 2 comprises an internal metallic annular tank 16 that delimits a cylindrical furnace 17 which is open at its ends. Two coils 18 and 19 are sunk in the tank 16. The coil 18 is arranged adjacent to the wall of the furnace 17 from which it is spaced by means of copper spacers 20 (FIG. 4) and is connected in fluid communication with an external user circuit, e.g. a sanitary water system. The coil 18 constitutes a water/water heat exchanger capable of absorbing heat from the water in the tank 16 and is fed via a lower pipe 21 and discharged through an upper pipe 23. The outer coil 19 acts as a condenser for a refrigerant of a heat pump which also comprises the compressor 15 and has an inlet pipe 24 and an outlet pipe 25.

A water supply pipe 26, a mid-tank dipping pipe 27 and a tank-top dipping pipe 28 for warm water also reach the tank 16.

The lower portion of the furnace 17 comprises a burner 29, e.g. a gas burner while a second tank or boiler 30 is accommodated in the upper portion and is provided with a plurality of spherical flasks 31, e.g. three in number, which are arranged spaced apart from, and in fluid communication with, one another through axial ducts 32. The boiler 30 receives water through an inlet pipe 34 and delivers warm water through a bottom dipping pipe 35 and a top dipping pipe 36. One annular plate 37 is arranged between one spherical flask 31 and the other and the various plates 37 are held in position by supports or spacers 38.

The annular plates 37 act as deflectors for the hot flue gases coming from the burner 29. As they rise from below, the flue gases are actually conveyed by the lower annular plate 37 towards the bottom surface 39 of the lower spherical flask 31 and are caused to flow laterally through a first narrow annular gap or interspace 40 between the spherical flask and the wall of the furnace 17 and are thus compressed. Beyond the gap 40, the flue gases can expand again and are deflected towards the central duct 32 by the second annular plate 37. The flue gases thus lap the duct 32 and the lower face of the successive spherical flask 31 before entering a second annular gap 40. Finally, the flue gases flow through the last annular plate 37 and lap the upper spherical flask and gather below a bell 41 which constitutes the ceiling of a chamber 42.

The bell 41 rests on the tank 16 by means of spacers 43 which delimit a peripheral slot 45 through which the gases flow towards an upper chamber 46 within the dome 3.

An insulation layer 47 of a suitable thermally insulating material is provided around the outer wall of the tank 16. One or more pipes 48 for discharging rainwater and condensation extend in said layer, as will be described in greater detail hereinafter.

A graphitized thin plate 49 can be installed around the insulation jacket or layer 47 and is in turn surrounded by an external wall 50 of transparent material, e.g. of glass or plexiglass or translucent or non-transparent material, such as a metal or metal alloy, so that an interspace or space 51 is delimited between the thin plate 49 and the wall 50 and the air flowing through it is heated by greenhouse effect or, in the case of a non-transparent wall 50, by effect of direct irradiation. The term "greenhouse effect" is herein used to describe both air heating phenomena. The thin plate 49, together with the insulating jacket 47, 5 advantageously delimits an internal gap or interspace 52 in which the air flowing therein is heated by contact with the thin plate 49 which absorbs solar irradiation heat.

The interspaces or gaps 51 and 52 open to the chamber 7 at the bottom and receive environment air sucked by the fans 13 and 14 through the grids 12. The same interspaces upwardly lead to the chamber 46 where they discharge warmed air which, while flowing through them, has absorbed heat and mixes with the flue gases arriving from the furnace 17.

The dome 3 comprises an external casing 53 of opaque material which delimits the chamber 46 where an evaporator 54 for the heat pump and an anchor 56 for lifting the apparatus with a crane or hoist are located. The casing 53 has a central aperture 57 at the top (FIG. 2), through which the flue gases and the air coming from the interspaces 51 and 52 and passing through the evaporator 54 to which they give off part of their heat, can escape.

By giving off heat to the evaporator, the air and the flue gases ensure continuous de-icing of the evaporator, thereby avoiding additional consumption of energy for cycle reversal and making the use of electric de-icing resistors unnecessary.

Practical tests conducted at an environmental temperature of −20° C. have confirmed a regular and trouble-free operation. Any condensation formed in the chamber 46 or rainwater penetrating through the hole 57 are disposed of by the pipes 48 which convey it to the base 1 where it mostly disperses by evaporation or is collected in an outer bottom basin.

The above described apparatus, instead of using the thermal energy produced by a burner, may be used for recovering heat from the warm waters discharged by some indutries or at hot sources.

In seasons with mild temperatures (spring, autumn) an apparatus according to the present invention improves its efficiency, since it prevailingly employs the heat pump and avoids as far as possible setting in operation of the burner. Of course, the efficiency of the apparatus depends on the climate pattern, to a certain extent.

If a compressor 15 of suitable power is used, the above described apparatus can be also used as an air-conditioning apparatus during the hot (summer) season. To do so it is sufficient to activate a switch 59 which is arranged on the control panel 8 and can also be an automatic switch, the temperature being controlled by the same thermostat 60 both in winter and in summer.

It will be noted that the integrated apparatus described above is suitable for heating systems at high (80° C.), medium (50° C.) and low (30° C.) temperatures. In fact, for a high-temperature system the heat pump can supply the return of the system (60° C.) and the burner can be used to increase the temperature of the delivery up to the required level. For a medium- or low-temperature system the heat pump can supply all the required thermal energy both to the delivery and the return and the burner can be activated only when the contribution of the heat pump is insufficient.

Thus, the integrated apparatus according to the invention is structured so as to exploit to a maximum extent the heat of the hot flue gases which are initially subject to a sequence of compressions and expansions against a large surface of the inner boiler 37 and then give off heat to the refrigerant flowing through the evaporator 54.

The water in the tanks is heated both by the combustion heat from the burner and by the condensation of the refrigerant in the heat pump and (when the apparatus is switched to operate as air-conditioning system, in which the evaporator 54 reverses its function and acts as a condenser) by the heat given off by the closed circuit comprising the radiators arranged in the environments to be conditioned. If heat accumulation saturates, exceeds a given level controlled by means of, suitable control thermostats, warm air is initially expelled and warm or sanitary water in excess is expelled. Should the user draw warm or sanitary water, expulsion ceases and heat exchange of the heat pump starts again and, if necessary, the burner is brought into action to ensure that the required minimum heat threshold is reached.

When the integrated apparatus is switched to act as an air-conditioning unit, sanitary warm water can be almost completely heated by taking advantage of the environmental heat (and therefore at almost no cost) and its use considerably increases the efficiency of the heat pump since it causes condensation of the refrigerant at the temperature of the water in the pipe network.

Many modifications and variations can be made to the above described integrated apparatus within the scope of the appended claims. Thus, for example, one or more electric fans 70 arranged at the dome 3, e.g. below the evaporator 54, can be provided in addition to, or in place of, the electric fans 13, 14.

I claim:

1. An integrated apparatus for producing warm water, comprising in combination;
   a heat pump, said heat pump comprising a compressor, a condenser, an expansion valve, an evaporator, a refrigerating fluid and a heat pump piping system, said compressor, said condenser, said expansion valve and said evaporator being connected in series by said heat pump piping system, said heat pump piping system conveying said refrigerating fluid,
   a boiler, said boiler comprising a heating element and a furnace, said heating element providing heat to said furnace,
   at least one greenhouse effect heat source, said at least one greenhouse effect heat source providing heat,
   a first water piping system conveying water, said first water piping system being arranged in heat transfer contact with said condenser of said heat pump, said first water piping system also being arranged in heat transfer contact with said furnace of said boiler,
   a second water piping system conveying water, said second water piping system being arranged in heat transfer contact with said furnace of said boiler,
   wherein said apparatus further comprises an evaporator chamber, said evaporator of said heat pump being arranged inside said evaporator chamber, said furnace of said boiler being arranged to provide heat to said evaporator arranged in said evaporator chamber, said at least one greenhouse effect heat source being arranged to provide heat to said evaporator arranged in said evaporator chamber.

2. Apparatus according to claim 1, wherein said boiler further comprises an annular tank, a cylindrical internal opening being defined by said annular tank, said furnace being cylindrical and being arranged in said internal opening of said annular tank, said first water piping system comprising a first coil pipe, said condenser of said heat pump comprising a second coil pipe, said first coil pipe and said second coil pipe being arranged inside said annular tank, said annular tank being filled with water which acts as a heat transfer medium, said second water piping system comprising a lobe tank having an inlet feed end and an outlet discharge end, said heating element being constituted by a gas burner, said lobe tank being arranged at least partially inside said furnace, above said gas burner, said gas burner providing flue gases.

3. Apparatus according to claim 2, wherein said lobe tank comprises at least one lobe, each at least one lobe being connected with another at least one lobe by means of an axial duct, at least one deflector being furthermore provided, each at least one deflector being arranged below each at least one lobe, at least one narrow gap being defined be each at least one deflector and said furnace, at least one wide gap being defined by each said axial duct and said furnace, a tortuous path being defined by a sequence of said at least one narrow gap and said at least one wide gap, said flue gases rising in said furnace along said tortuous path.

4. Apparatus according to claim 2, further comprising a bell-shaped element, a collecting chamber being delimited by said bell-shaped element, said bell-shaped element being arranged above said lobe tank and said furnace, said bell-shaped element overlapping said furnace so as to define a peripheral slot, said evaporator chamber being arranged above said bell-shaped element, said peripheral slot defining an escape route for said flue gases, whereby said flue gases rise and pass over said lobe tank to heat water therein, said flue gases then rise to collect and mix in said collecting chamber, said flue gases then flow through said peripheral slot and rise to pass over said evaporator arranged in said evaporator chamber, thereby supplying heat to said evaporator.

5. Apparatus according to claim 2, wherein an insulating layer is provided around said annular tank, said at least one greenhouse effect heat source comprises an external wall, said external wall being cylindrical and being arranged around and spaced apart from said insulating layer, a continuous interspace being defined between said insulating layer and said external wall, an upper end being defined by said continuous interspace, a lower end being defined by said continuous interspace, said evaporator chamber being arranged above said furnace, said annular tank, said continuous interspace, and said external wall, said lower end of said continuous interspace being in communication with environmental air, said upper end of said continuous interspace being in communication with said evaporator chamber, whereby air flows from said lower end to said upper end in said continuous interspace and is heated by irradiation from sunlight, thereby heated air is supplied to said evaporator arranged in said evaporator chamber.

6. Apparatus according to claim 2, wherein an insulating layer is provided around said annular tank, said at least one greenhouse effect heat source comprises an external wall and a thin partition plate, said partition plate being cylindrical and being arranged around and spaced apart from said insulating layer, an inner continuous interspace being defined between said insulating layer and said partition plate, said external wall being cylindrical and being arranged around and spaced apart from said partition plate, an outer continuous interspace being defined between said partition plate and said external wall, an inner upper end being defined by said inner continuous interspace, an inner lower end being defined by said inner continuous interspace, an outer upper end being defined by said outer continuous interspace, an outer lower end being defined by said outer continuous interspace, said evaporator chamber being arranged above said furnace, said annular tank, said inner continuous interspace, said outer continuous interspace and said external wall, said inner lower end and said outer lower end being in communication with environmental air, said inner upper end and said outer upper end being in communication with said evaporator chamber, said partition plate having a blackened outer surface facing said external wall, said blackened outer surface acting as a black body for absorbing irradiation from sunlight, whereby air flows from said inner lower end to said inner upper end in said inner continuous interspace and is heated mostly by said partition plate, air flows from said outer lower end to said outer upper end in said outer continuous interspace and is heated by irradiation from sunlight, thereby heated air is supplied to said evaporator arranged in said evaporator chamber.

7. Apparatus according to claim 1, further comprising an opaque external casing, said external casing surrounding said evaporator chamber, said external casing having a discharge end communicating with environmental air, said discharge end of said external casing allowing for heat coming from said at least one greenhouse effect heat source and said furnace of said boiler and passing over said evaporator arranged in said evaporator chamber to escape.

8. Apparatus according to claim 1, further comprising at least one pipe and water collecting means, said at least one pipe being in fluid communication between said evaporator chamber and said water collecting means for draining excess water from said evaporator chamber to said collecting means.

9. Apparatus according to claim 2, further comprising at least one pipe, water collecting means, and an insulating layer, said insulating layer being arranged around said annular tank, said at least one pipe being in fluid communication between said evaporator chamber and said water collecting means for draining excess water from said evaporator chamber to said collecting means, said at least one pipe being buried in said insulating layer.

10. An integrated apparatus for heating water, comprising in combination;
a heat pump, said heat pump having a condenser and an evaporator for conveying a refrigerant therethrough,
a boiler, said boiler comprising a heating element and a furnace, said heating element providing heat to said furnace, said furnace of said boiler being arranged to provide heat to said evaporator of said heat pump,
at least one greenhouse effect heat source, said at least one greenhouse effect heat source being arranged to provide heat to said evaporator of said heat pump,
a first water piping system, said first water piping system conveying water and being arranged in heat transfer contact with said condenser of said heat pump,
a second water piping system, said second water piping system conveying water and being arranged in heat transfer contact with said furnace of said boiler.

11. Apparatus according to claim 10, wherein said boiler operates independently of said heat pump, said boiler being turned on and providing heat simultaneously when said heat pump is in operation.

12. Apparatus according to claim 10, wherein said boiler operates independently of said heat pump, said boiler being turned off when said heat pump is operating.

13. Apparatus according to claim 10, wherein said first water piping system is also arranged in that transfer contact with said furnace of said boiler.

14. Apparatus according to claim 10, further comprising an evaporator chamber, said evaporator being arranged in said evaporator chamber, and boiler further comprising an annular tank, a cylindrical internal opening being defined by said annular tank, said furnace being cylindrical and being arranged in said internal opening of said annular tank, said first water piping system comprising a first coil pipe, said condenser of said heat pump comprising a second coil pipe, said first coil pipe and said second coil pipe being arranged inside said annular tank, said annular tank being filled with water which acts as a heat transfer medium, said second water piping system comprising a lobe tank having an inlet feed end and an outlet discharge end, said heating element being constituted by a gas burner, said lobe tank being arranged at least partially inside said furnace, above said gas burner, said gas burner providing flue gases.

15. Apparatus according to claim 14, wherein said lobe tank comprises at least one lobe, each at least one lobe being connected with another at least one lobe by means of an axial duct, at least one deflector being furthermore provided, each at least one deflector being arranged below each at least one lobe, at least one narrow gap being defined be each at least one deflector and said furnace, at least one wide gap being defined by each said axial duct and said furnace, a tortuous path being defined by a sequence of said at least one narrow gap and said at least one wide gap, said flue gases rinsing in said furnace along said tortuous path.

16. Apparatus according to claim 14, further comprising a bell-shaped element, a collecting chamber being delimited by said bell-shaped element, said bell-shaped element being arranged above said lobe tank and said furnace, said bell-shaped element overlapping said furnace so as to define a peripheral slot, said evaporator chamber being arranged above said bell-shaped element, said peripheral slot defining an escape route for said flue gases, whereby said flue gases rise and pass over said lobe tank to that water therein, said flue gases then rise to collect and mix in said collecting chamber, said flue gases then flow through said peripheral slot and rise to pass over said evaporator arranged in evaporator chamber, thereby supplying heat to said evaporator.

17. Apparatus according to claim 14, wherein an insulating layer is provided around said annular tank, said at least one greenhouse effect heat source comprises an external wall, said external wall being cylindrical and being arranged around and spaced apart from said insulating layer, a continuous interspace being defined between said insulating layer and said external wall, an upper end being defined by said continuous interspace, a lower end being defined by said continuous interspace, said evaporator chamber being arranged above said furnace, said annular tank, said continuous interspace, and said external wall, said lower end of said continuous interspace being in communication with environmental air, said upper end of said continuous interspace being in communication with said evaporator chamber, whereby air flows from said lower end to said upper end in said continuous interspace and is heated by irradiation from sunlight,. thereby heated air is supplied to said evaporator arranged in said evaporator chamber.

18. Apparatus according to claim 14, wherein an insulating layer is provided around said annular tank, said at least one greenhouse effect heat source comprises an external wall and a thin partition plate, said partition plate being cylindrical and being arranged around and spaced apart form said insulating layer, an inner continuous interspace being defined between said insulating layer and said partition plate, said external wall being cylindrical and being arranged around and spaced apart from said partition plate, an outer continuous interspace being defined between said partition plate and said external wall, an inner upper end being defined by said inner continuous interspace, an inner lower end being defined by said inner continuous interspace, an outer upper end being defined by said outer continuous interspace, an outer lower end being defined by said outer continuous interspace, said evaporator chamber being arranged above said furnace, said annular tank, said inner continuous interspace, said outer continuous interspace and said external wall, said inner lower end and said outer lower end being in communication with environmental air, said inner upper end and said outer upper end being in communication with said evaporator chamber, said partition plate having a blackened outer surface facing said external wall, said blackened outer surface acting as a black body for absorbing irradiation sunlight, whereby air flows from said inner lower end to said inner upper end in said inner continuous interspace and is heated mostly by said partition plate, air flows from said outer lower end to said outer upper end in said outer continuous interspace and is heated by irradiation from sunlight, thereby heated air is supplied to said evaporator arranged in said evaporator chamber.

19. Apparatus according to claim 10, further comprising an opaque external casing, said external casing surrounding said evaporator chamber, said external casing having a discharge end communicating with environmental air, said discharge end of said external casing allowing for heat coming from said at least one greenhouse effect heat source and said furnace of said boiler and passing over said evaporator arranged in said evaporator chamber to escape.

20. Apparatus according to claim 10, further comprising at least one pipe and water collecting means, said at least one pipe being in fluid communication between said evaporator chamber and said water collecting means for draining excess water from said evaporator chamber to said collecting means.

21. Apparatus according to claim 14, further comprising at least one pipe, water collecting means, and an insulating layer, said insulating layer being arranged around said annular tank, said at least one pipe being in fluid communication between said evaporator chamber and said water collecting means for draining excess water from said evaporator chamber to said collecting means, said at least one pipe being buried in said insulating layer.

22. Apparatus according to claim 10, wherein said apparatus is adapted to function as an air-conditioner.

23. Apparatus according to claim 10, wherein said second water piping system and said first water piping system are in heat transfer contact with warm waters discharged by hot sources.

* * * * *